(12) United States Patent
Isson et al.

(10) Patent No.: US 12,105,215 B2
(45) Date of Patent: Oct. 1, 2024

(54) METHOD AND SYSTEM FOR GEOLOCATING A TERMINAL OCCUPYING PARTICULAR GEOGRAPHICAL POSITIONS

(71) Applicant: SIGFOX, Labege (FR)

(72) Inventors: Olivier Isson, Saint-Orens de Gameville (FR); Renaud Marty, Ramonville Saint Agne (FR)

(73) Assignee: UNABIZ, Labege (FO)

( * ) Notice: Subject to any disclaimer, the term of this patent is extended or adjusted under 35 U.S.C. 154(b) by 1084 days.

(21) Appl. No.: 16/762,904

(22) PCT Filed: Nov. 30, 2018

(86) PCT No.: PCT/EP2018/083089
§ 371 (c)(1),
(2) Date: Apr. 16, 2021

(87) PCT Pub. No.: WO2019/106128
PCT Pub. Date: Jun. 6, 2019

(65) Prior Publication Data
US 2021/0247481 A1    Aug. 12, 2021

(30) Foreign Application Priority Data

Nov. 30, 2017    (FR) .................................... 17 61431

(51) Int. Cl.
*G01S 5/02* (2010.01)
*G06N 20/00* (2019.01)
*H04W 64/00* (2009.01)

(52) U.S. Cl.
CPC ...... *G01S 5/02527* (2020.05); *G01S 5/02521* (2020.05); *G01S 5/02524* (2020.05);
(Continued)

(58) Field of Classification Search
CPC ............... G01S 5/0252; G01S 5/02521; G01S 5/02524; G01S 5/02525; G01S 5/02527; H04W 64/00
(Continued)

(56) References Cited

U.S. PATENT DOCUMENTS

| 6,064,339 A | * | 5/2000 | Wax | G01S 5/02521 342/417 |
| 6,839,027 B2 | * | 1/2005 | Krumm | G01S 5/02524 342/465 |

(Continued)

FOREIGN PATENT DOCUMENTS

| DE | 10118777 A1 | * | 12/2002 | .......... G01S 5/0252 |
| EP | 2 755 431 A2 | | 7/2014 | |
| WO | 2012/080787 A1 | | 6/2012 | |

OTHER PUBLICATIONS

H. Sallouha, A. Chiumento and S. Pollin, "Localization in long-range ultra narrow band IoT networks using RSSI," 2017 IEEE International Conference on Communications (ICC), Paris, France, May 2017, pp. 1-6, doi: 10.1109/ICC.2017.7997195. (Year: 2017).*

(Continued)

*Primary Examiner* — Chuong P Nguyen
(74) *Attorney, Agent, or Firm* — H&I PARTNERS; Chai Im; C. Andrew Im

(57) ABSTRACT

A method for geolocating a terminal of a wireless communication system. A set of reference elements is determined with the aid of messages transmitted by calibration terminals during a calibration phase. Each reference element includes a radio signature and a geographical position of a calibration terminal when a message is transmitted. A refinement phase makes it possible to clean and/or to enrich the set of reference elements by virtue of the identification of points of interest corresponding to preferential positions of transmission of messages by the terminals. During a search phase, (Continued)

the position of a terminal of interest is determined based on its radio signature and of the modified set of reference elements.

16 Claims, 7 Drawing Sheets

(52) U.S. Cl.
CPC ......... *G01S 5/0252* (2013.01); *G01S 5/02525* (2020.05); *G06N 20/00* (2019.01); *H04W 64/00* (2013.01)

(58) Field of Classification Search
USPC ........................................................ 342/451
See application file for complete search history.

(56) References Cited

U.S. PATENT DOCUMENTS

| | | | | |
|---|---|---|---|---|
| 7,228,136 | B2* | 6/2007 | Myllymaki | G01S 5/02521 |
| | | | | 455/456.1 |
| 8,290,507 | B2* | 10/2012 | Zuniga | G01S 5/021 |
| | | | | 455/456.6 |
| 8,886,210 | B1* | 11/2014 | Sugar | G01S 5/0252 |
| | | | | 455/456.2 |
| 9,084,217 | B2* | 7/2015 | Wax | H04W 64/00 |
| 9,285,453 | B2* | 3/2016 | Schantz | G01S 5/02525 |
| 9,313,617 | B2* | 4/2016 | Dousse | G01S 5/02524 |
| 9,829,563 | B2* | 11/2017 | Xiao | H04W 64/00 |
| 10,582,105 | B2* | 3/2020 | Naguib | G01S 5/02525 |
| 10,976,405 | B2* | 4/2021 | Isson | G01S 5/02527 |
| 2004/0072577 | A1* | 4/2004 | Myllymaki | H04W 64/00 |
| | | | | 370/480 |
| 2004/0095276 | A1* | 5/2004 | Krumm | G01S 5/02521 |
| | | | | 342/465 |
| 2005/0096068 | A1* | 5/2005 | Bahl | G01C 21/206 |
| | | | | 455/456.6 |
| 2006/0267833 | A1* | 11/2006 | Langford | G01S 5/02524 |
| | | | | 342/174 |
| 2011/0177831 | A1 | 7/2011 | Huang | |
| 2012/0115510 | A1* | 5/2012 | Denby | G01S 5/02521 |
| | | | | 455/456.1 |
| 2013/0172007 | A1* | 7/2013 | Wax | G01S 5/0252 |
| | | | | 455/456.1 |
| 2013/0344888 | A1* | 12/2013 | Dousse | H04W 4/029 |
| | | | | 455/456.1 |
| 2016/0165566 | A1 | 6/2016 | Jung | |
| 2021/0003657 | A1* | 1/2021 | Isson | G01S 5/0009 |
| 2022/0221551 | A1* | 7/2022 | Larignon | G01S 5/0289 |
| 2024/0089902 | A1* | 3/2024 | Isson | G01S 5/0295 |

OTHER PUBLICATIONS

Zheng et al., "Mining interesting locations and travel sequences from GPS trajectories," International World Wide Web Conference 18th, Apr. 20, 2009, pp. 791-800.

Ibrahim et al., "CellSense: An Accurate Energy-Efficient GSM Positioning System," IEEE Trans. Vehicular Technology, Jan. 1, 2012, pp. 286-296, vol. 61, No. 1.

* cited by examiner

METHOD AND SYSTEM FOR GEOLOCATING A TERMINAL OCCUPYING PARTICULAR GEOGRAPHICAL POSITIONS

RELATED APPLICATIONS

This application is a § 371 application of PCT/EP2018/083089 filed Nov. 30, 2018, which claims priority from French Patent Application No. 17 61431 filed Nov. 30, 2017, each of which is incorporated herein by reference in its entirety.

TECHNICAL FIELD

The present invention belongs to the field of geolocation. In particular, the invention relates to a method and a system for geolocating a terminal of a wireless communication system. The invention applies particularly well to the geolocation of smart objects of the "Internet of Things" (or IoT) type.

BACKGROUND OF THE INVENTION

Over the last few years, the growing use of wireless communication systems has naturally led to developing services based on the geographic position of an object and used for example for navigation assistance, traffic management, monitoring of the transport of merchandise, remote reading of information in general, etc.

Satellite positioning systems like the GPS ("Global Positioning System") are some of the most well-known geolocation techniques. These systems are based on the use by a receiver terminal of radio signals emitted by dedicated satellites. Satellite geolocation is particularly precise, but it suffers from a plurality of disadvantages, in particular the cost and the electricity consumption induced by the integration of a GPS receiver into an object, as well as its lack of performance in closed zones.

Other techniques exist for geolocating a terminal on the basis of signals exchanged with the base stations of an access network to which it is connected. In cellular networks, for example such as GSM (Global System for Mobile Communications), it is known to estimate the position of a terminal as being that of the base station to which it is currently associated. This method has, however, mediocre geolocation precision since the coverage zone of a base station can reach several kilometers, or even several tens of kilometers in radius.

Other methods involve estimating the distances that separate a terminal from a plurality of base stations by calculating arrival times, angles of propagation or differences in frequency for the signals exchanged between the terminal and the base stations. These various methods all have, however, the disadvantage of requiring specific equipment and software. Moreover, they often require a costly synchronization of the various base stations acting as observation points. Finally, they are particularly sensitive to the phenomenon called multipath (propagation of the same radio signal via a plurality of paths because of phenomena of reflection, refraction and diffraction on the obstacles encountered).

Other geolocation methods are based on the level of received power (RSSI, from "Received Signal Strength Indicator") of a signal exchanged between a terminal and a base station. These methods are particularly well adapted to the wireless communication systems of the cellular network type (for example such as GSM) for which the RSSI information is directly available since it is used by the communication system itself. These methods are based on the fact that a radio signal is attenuated in the atmosphere and thus that the RSSI level of a signal received by a receiver varies according to the distance that separates the receiver from the emitter of the signal. Thus, it is possible to determine the geographic position of a terminal by trilateration by estimating the distance separating the terminal from various base stations that surround it on the basis of the RSSI levels measured by the base stations. The disadvantage of such a method for geolocation via trilateration based on the RSSI levels is its lack of precision due to the fact that the numerous parameters that influence the attenuation of the signal (obstacles, radio interference, movement of the terminal, etc.) make the function that defines the distance on the basis of an RSSI level very complex.

New methods for geolocation based on the RSSI levels have thus been developed. These new methods are based on machine learning techniques. Concretely, this involves building, during a calibration phase, a database that associates, with known geographical positions, a radio signature corresponding to all of the RSSI levels measured for a terminal at the position in question for a set of base stations of the system. Then, during a search phase, a radio signal observed for a terminal located at an unknown position is compared to all of the signatures of the database in order to estimate the position of the terminal on the basis of the position(s) corresponding to the most similar signature(s).

Such methods have, however, several disadvantages, in particular in the case in which the geographic zone to be covered is very vast, for example if an entire country, or even a continent, must be covered. A first disadvantage relates to the geolocation precision. Indeed, it happens that two radio signatures corresponding to two neighboring geographic positions are significantly different, or that two particularly similar radio signatures correspond to two distant geographic positions. The establishment of a relationship between a radio signature and an associated geographic position is thus made difficult because of the noise generated by such situations. Another disadvantage relates to the complexity of the machine learning algorithm used. Indeed, to obtain sufficient precision, it is necessary to insert a large number of elements into the database built during the calibration phase. Moreover, if the zone to be covered is vast, there is a large number of base stations to take into account. All this contributes to considerably increasing the data at the input of the machine learning algorithm, and thus to creating constraints of capacity and calculation time. To carry out the calibration phase, it is known to place onboard, in a fleet of vehicles that travel across the zone to be covered, apparatuses adapted to precisely provide the geographic position and the RSSI levels for the base stations of the communication system at various points (the English term for qualifying this phase is "war-driving"). The greater the number of points, the better the performance of the geolocation method in terms of precision, but the longer and the more costly the calibration phase.

SUMMARY OF THE INVENTION

The goal of the present invention is to overcome all or a part of the disadvantages of the prior art, in particular those disclosed above.

For this purpose, and according to a first aspect, the present invention proposes a method for geolocating a terminal, called "terminal of interest", of a wireless communication system. The method includes:

a determination, on the basis of messages emitted by other terminals, called "calibration terminals", and received by base stations of said wireless communication system, of a set of reference elements, each reference element including a radio signature associated with a geographic position of a calibration terminal when a message is emitted, said radio signature corresponding to a set of values representative of the quality of radio links existing between said calibration terminal and base stations, a determination, on the basis of a message emitted by said terminal of interest located at a geographic position to be estimated, of a radio signature for said terminal of interest, an identification of particular geographic positions, called "points of interest", on the basis of the geographic positions of the reference elements of the set of reference elements, a modification of the set of reference elements on the basis of the points of interest identified, an estimation of the geographic position of said terminal of interest on the basis of the radio signature of said terminal of interest and the modified set of reference elements.

The estimation of the geographic position of a terminal of interest is for example carried out by a machine learning algorithm that has the goal of establishing a relationship between a radio signature and a geographic position.

A point of interest corresponds to a preferred point of emission of messages at which, for the terminals of the wireless communication system in question, there are on average more messages emitted from or near a point of interest than from another geographic position.

For example, a point of interest can correspond to particular geographic position at which the probability of the presence of a terminal of the system in question is greater than elsewhere. In particular, in the case of the transport of palettes of merchandise equipped with terminals and moving from warehouse to warehouse with a travel time relatively short with respect to the time spent in a warehouse, said warehouses can correspond to points of interest.

According to another example, a point of interest can correspond to a point of convergence of terminals of the system. In particular, airports can correspond to points of interest for luggage equipped with terminals of the system.

The points of interest can be identified dynamically on the basis of the reference elements provided by the calibration terminals. In specific embodiments, at least a part of the points of interest can also be known a priori.

The modification of the set of reference elements corresponds for example to a refining phase during which undesirable disparate reference elements are eliminated (for example those that are judged to be far from the points of interest) and/or additional information is added to relevant reference elements (for example those that are judged to be close to the points of interest), in order to clean up and/or enrich the set of reference elements. Such arrangements allow to gain in terms of geolocation precision since this refining phase reinforces the relationship existing between a radio signature and a geographic position by taking advantage of the existence of points of interest at which the probability of the presence of a terminal is greater than elsewhere.

Moreover, the elimination of disparate elements contributes to reducing the number of reference elements used by the learning algorithm, and thus to reducing the complexity thereof, which translates into a gain in terms of capacity and calculation time.

Finally, these arrangements can allow to reduce the size of the radio signature, for example by only considering the base stations that are located near the points of interest, which contributes even more to reducing the complexity of the learning algorithm.

In specific embodiments, the invention can further include one or more of the following features, taken alone or according to all the technically possible combinations.

In specific embodiments, the geographic position of the terminal of interest is estimated in the form of a value representative of a probability for said terminal of interest of being located at an identified point of interest.

Such arrangements allow for example to conclude that the terminal of interest is located at the point of interest for which the probability value is the greatest if this value is greater than a certain threshold, or to conclude, if this value is lower than said threshold, that the terminal of interest is not located near any point of interest (it is for example in transit between two points of interest).

In specific embodiments, the identification of the points of interest includes:
a division of a geographic zone to be covered into a plurality of cells having a predefined size,
a calculation for each cell of a value representative of a number of reference elements located in said cell,
if the value calculated satisfies a predefined criterion, a definition of a point of interest according to said cell and/or the geographic positions of the reference elements located in said cell.

In specific embodiments, the identification of the points of interest includes a step of calculating, for each reference element, distances separating said reference element and each other reference element, as well as the following steps carried out iteratively on a temporary set of reference elements initially corresponding to the set of reference elements, until a stoppage condition is reached:
a calculation, for each reference element of the temporary set of reference elements, of a value representative of a number of reference elements located at a distance lower than a predefined threshold, called "neighboring elements",
if the greatest value calculated, for an element called "element of interest", is greater than a predefined threshold:
a definition of a point of interest according to the geographic positions of the element of interest and/or of its neighboring elements,
an elimination of the element of interest and of its neighboring elements from the temporary set of reference elements.

In specific embodiments, the geolocation method further includes a step of filtering the points of interest identified according to their geographic positions and/or a value representative of a number of reference elements of the set of reference elements located at a distance lower than a predefined threshold.

In specific embodiments, the value representative of a number of reference elements is calculated according to a weighting factor assigned to each reference element and representative of a time that has passed between the moment of emission of the message by the calibration terminal and the moment at which the points of interest are identified.

Such arrangements allow in particular to favor recent points of interest by giving more importance (that is to say by assigning a greater weighting) to the reference elements obtained at a time close to the time of estimation of the position of the terminal of interest.

In specific embodiments, the modification of the set of reference elements includes the following steps for each reference element of the set of reference elements:
- a calculation of the smallest distance separating said reference element and one of the points of interest identified,
- if the smallest distance calculated is less than a predefined threshold:
    - an association of the corresponding point of interest with said reference element,
- otherwise:
    - an elimination of said reference element from the set of reference elements.

In specific embodiments, the modification of the set of reference elements includes the following steps for each reference element of the set of reference elements:
- a calculation, for each point of interest identified, of a value representative of the distance that separates said reference element from said point of interest,
- an association of the values thus calculated with said reference element.

In specific embodiments, a radio link is an upstream link to a base station of the wireless communication system.

In specific embodiments, a determination of the radio signature of a terminal includes:
- an emission by the terminal of a message to the base stations,
- a measurement, for each base station, of a value representative of the quality of the radio link existing between said terminal and the base station in question on the basis of the message received from said terminal,
- a formation, by a server connected to the base stations, of the radio signature of the terminal on the basis of the measured values.

In specific embodiments, a calibration terminal is provided with a positioning system and the determination of the radio signature of said calibration terminal further includes:
- an inclusion, in the message emitted by said calibration terminal, of the current geographic position of said calibration terminal measured by the positioning system,
- an extraction, by the server, of the geographic position contained in said message.

Such arrangements allow in particular to be able to easily enrich the set of reference elements with new reference elements coming from the calibration terminals, which allows to discover new points of interest that can appear over time and/or forget points of interest that have become obsolete.

The calibration phase involving defining or enriching the set of reference elements can be carried out once at the beginning, or it can be repeated recurrently (for example periodically or in a manner controlled by sending control messages to the calibration terminals), or it can be carried out continuously (for example if the calibration terminals regularly emit messages including their current geographic position).

Thanks to the existence of certain specific terminals equipped with a positioning system, it is possible to entirely automate the calibration phase that involves defining the set of reference elements. Moreover, the implementation of the geolocation method in the wireless communication system is particularly easy and not costly since it does not require additional specific hardware at the base stations or at the majority of the terminals (only the terminals acting as calibration terminals can require hardware and/or software modifications).

In specific embodiments, the value representative of the quality of the radio link existing between a terminal and a base station is a level of received power of a radio signal exchanged between said base station and said terminal.

In specific embodiments, the radio link is an ultra-narrowband communication channel.

An ultra-narrowband wireless communication system ("Ultra Narrow Band" or UNB in the Anglo-Saxon literature) is particularly adapted to uses of the IoT type. Indeed, it allows low-bitrate communications with a long range and low energy consumption (system of the LPWAN type, for "Low Power Wide Area Network" in English).

In specific embodiments, the estimation of the geographic position of a terminal of interest on the basis of the radio signature of said terminal of interest and the modified set of reference elements is carried out using a classification machine learning algorithm based on a technique of decision trees.

According to a second aspect, the present invention relates to a wireless communication system including terminals and an access network including base stations and a server connected to said base stations. Said system includes a database memorizing a set of reference elements formed on the basis of messages emitted by terminals, called "calibration terminals", and received by at least one base station. Each reference element includes a radio signature associated with a geographic position of a calibration terminal when a message is emitted. Said radio signature comprises values representative of the quality of radio links existing between said calibration terminal and base stations. Moreover, the access network is configured to:
- measure values representative of the quality of radio links existing between base stations and a terminal, the geographic position of which must be estimated, called "terminal of interest",
- form a radio signature corresponding to all of the values measured for said terminal of interest,
- identify particular geographic positions, called "points of interest", on the basis of the set of reference elements,
- modify the set of reference elements on the basis of the points of interest identified,
- estimate the geographic position of the terminal of interest on the basis of the radio signature of the terminal of interest and the modified set of reference elements.

BRIEF DESCRIPTION OF THE DRAWINGS

The invention will be better understood upon reading the following description, given as an example that is in no way limiting, and made in reference to FIGS. 1 to 14 which show.

In these drawings, references identical from one drawing to another designate identical or analogous elements. For reasons of clarity, the elements shown are not necessarily to scale, unless otherwise mentioned.

DETAILED DESCRIPTION OF EMBODIMENTS

As indicated above, the present invention aims to estimate the geographic position of a terminal, called "terminal of interest", of a wireless communication system using a learning method based on information representative of the quality of radio links existing between said terminal and base stations of said wireless communication system.

Figure 1:
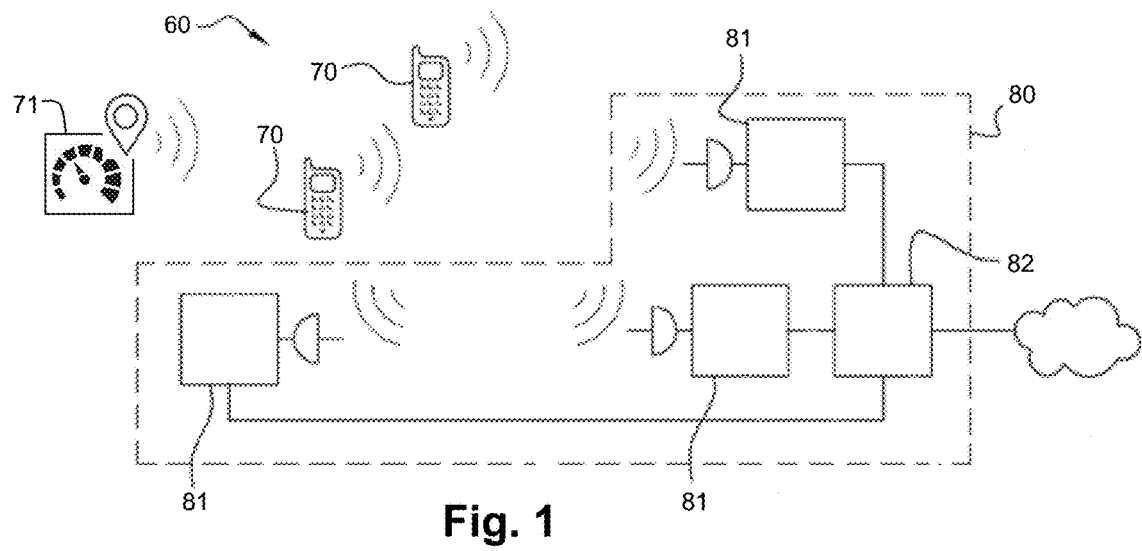
FIG. 1: a diagram of a wireless communication system including a calibration device.

FIG. 1 schematically shows a wireless communication system 60, including a plurality of terminals 70 and an access network 80 including a plurality of connected base stations 81 and a server 82 connected to said base stations 81. In such a system 60, the communications can generally be bidirectional, that is to say that data can be transmitted from the access network 80 to a terminal 70 over a downstream radio link, or from a terminal 70 to the access network 80 over an upstream radio link. Thus, a measurement of the quality of the radio link existing between a terminal 70 and a base station 81 of the access network 80 can for example be carried out by one or the other of these entities.

Thus, it is possible to introduce into the wireless communication system 60 one or more calibration devices 71 adapted to determining with precision the current geographic position, for example with a positioning system such as a GPS receiver. This calibration device 71 further has means configured to allow the measurement of a value representative of the quality of the radio link existing between it and the base stations 81 of the access network 80. As indicated above, this measurement can for example be carried out by the calibration device 71 itself, on the downstream link, or by a base station 81 of the access network 81, on the upstream link. If the measurement is carried out by the calibration device 71 on the downstream link, this measurement can for example be made on radio signals intended for terminals 70 of the system other than the calibration device 71.

The values representative of the quality of the radio link existing between a terminal 70 or a calibration device 71 and a base station 81 can be transmitted to the server 82 in order for it to implement certain steps of a geolocation method.

Figure 2:
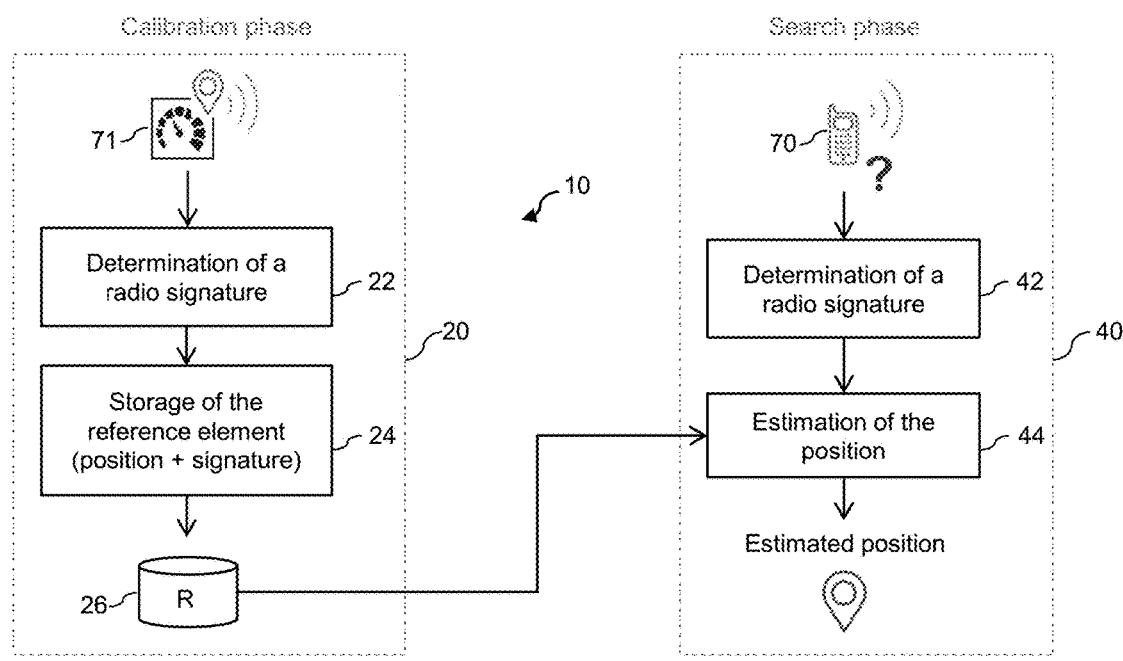
FIG. 2: a diagram illustrating the main steps of a conventional method for geolocating a terminal of a wireless communication system.

FIG. 2 shows the two main phases of a method 10 for geolocating a terminal 70 of interest of a wireless communication system 60 based on a learning method.

A first calibration phase 20 includes:
- a step 22 of determining radio signatures respectively associated with known geographic positions, each radio signature corresponding to a set of values representative of the quality of radio links existing between a calibration device 71, the geographic position of which is known, and a plurality of base stations 81 of the access network 80 of the wireless communication system 60, and
- a step 24 of storing, in a set 26 of reference elements, each radio signature determined and the associated geographic position of the calibration device 71.

In the rest of the description, "geographic position" means a set of two coordinates corresponding to the latitude and the longitude, respectively. It should be noted that alternatives are possible for defining a geographic position. For example, a third coordinate corresponding to the altitude with respect to the average sea level could also be taken into account.

In short, this calibration phase 20 involves making a sort of radio map of the geographic zone considered.

Then, a search phase 40 includes:
- a step 42 of determining a radio signature for said terminal 70 of interest located at a geographic position to be estimated,
- a step 44 of estimating the geographic position of said terminal 70 of interest on the basis of the radio signature determined and the set 26 of reference elements acquired during the calibration phase 20.

The geolocation method 10 according to the invention introduces an additional phase 30, called "refining phase 30", that has the goal of cleaning up the set 26 of reference elements (that is to say eliminate undesirable reference elements) and/or enriching it (that is to say adding information to the reference elements preserved) in order to improve the estimation 44 of the geographic position of a reference terminal 70.

This refining phase 30 is based on the idea that the terminals 70 can have a tendency to pass through particular geographic positions of convergence of the terminals 70 of the system 60 (this means geographic positions though which a large number of terminals 70 tend to pass). At such particular geographic positions, the number of message emitted by the terminals 70 is thus on average greater than elsewhere. In certain cases, the terminals 70 can also preferably occupy a finite set of particular geographic positions (in other words, at a given time, a terminal 70 can statistically have a greater probability of being located at one of these particular geographic positions than elsewhere). In the description, "point of interest" refers to such a particular geographic position.

Such a situation is observed for example in the case of the transport of merchandise moving from warehouse to warehouse with a travel time relatively short with respect to the time spent in a warehouse. It is for example possible to equip palettes used for the transport of merchandise with terminals 70 of the wireless communication system 60 in order to be able to geolocate them. The various warehouses in which the palettes are successively stored thus correspond to points of interest for the geolocation method 10. A truck transporting said palettes can for example carry a calibration device 71 allowing to build the set 26 of reference elements.

To estimate the geographic position of a terminal 70 of interest, rather than estimating the position of the terminal 70 over the entire geographic zone to be covered, the geolocation method 10 according to the invention estimates the position of the terminal 70 of interest according to the points of interest identified. In other words, rather than using a conventional regression method that would require a very high number of reference elements (and thus very large capacities and calculation times) to obtain a reasonable precision, the geolocation method 10 according to the invention uses a classification machine learning algorithm that involves for example assigning to the terminal 70 of interest a probability of being located at each of the points of interest identified. The estimated geographic position of the terminal 70 of interest can thus for example be defined as the geographic position of the point of interest at which it has the greatest probability of being located. According to the value of the returned probability (for example if it is less than a predefined threshold), it is also possible to determine whether the terminal 70 is not located at a point of interest (for example if it is a terminal 70 onboard a palette that is in transit between two warehouses).

Figure 3:
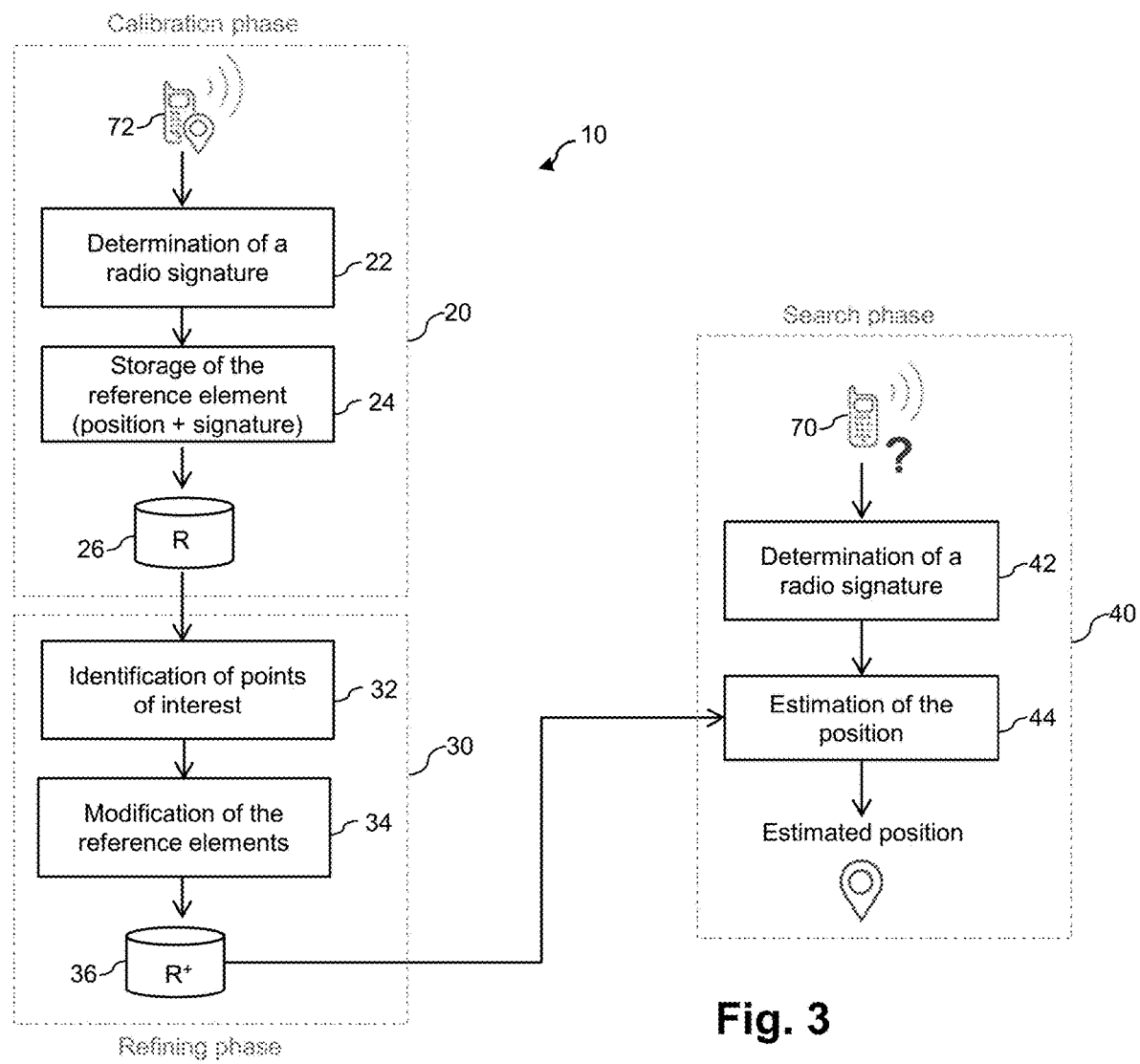
FIG. 3: a diagram illustrating the main steps of a geolocation method according to the invention.

FIG. 3 schematically shows the main phases of a geolocation method 10 according to the invention. Besides the calibration phase 20 and the search phase 40 already described in reference to FIG. 2, the geolocation method 10 includes a refining phase 30.

This refining phase 30 includes a first step 32 of identifying points of interest that allows to define, on the basis of the set 26 of reference elements acquired during the calibration phase 20, a set 35 of points of interest. This step will be described in detail later in reference to FIGS. 7 to 10.

Then, using the set 35 of points of interest identified, a step 34 of modifying the set 26 of reference elements provides a modified set 36 of reference elements that is thus used during the search phase 40 to determine the geographic position of a terminal 70 of interest. This modification step 34 will be described in detail later in reference to FIGS. 10 and 11.

Indeed, it is advantageous to identify points of interest and to assign more importance to the reference elements, the geographic position of which is close to that of a point of interest. It is for example possible to eliminate the reference elements, the geographic position of which is distant from a point of interest by a distance greater than a predefined threshold. Moreover, it is advantageous to associate, with each reference element, the closest point of interest, or a value representative of the distance that separates the geographic position of said reference element from each point of interest. Such arrangements indeed allow to reduce a "noise" generated by the elements that are not grouped together near the points of interest in the relationship that the machine learning algorithm seeks to establish between a radio signature and a point of interest.

Here, "distance" means a distance calculated in a conventional manner between two geographic positions expressed using the longitude and the latitude. Thus, "distance between two reference elements" means the distance between the geographic positions of said two reference elements. The same applies throughout the description, unless otherwise mentioned.

In the rest of the description, for example and in a non-limiting manner, the case is considered of an ultra-narrowband wireless communication system 60. "Ultra-narrowband" ("Ultra Narrow Band" or UNB in the Anglo-Saxon literature) means that the instantaneous frequency spectrum of the radioelectric signals emitted by the terminals has a frequency width of less than two kilohertz, or even less than one kilohertz. "Radioelectric signal" means an electromagnetic wave propagating via wireless means, the frequencies of which are comprised in the conventional spectrum of the radioelectric waves (several hertz to several hundred gigahertz). Such UNB wireless communication systems are particularly adapted to uses of the IoT type or of the M2M type (Anglo-Saxon acronym for "Machine to Machine").

In such a wireless communication system 60, the exchanges of data are essentially monodirectional, in this case over an upstream link from the terminals 70 to the access network 80 of said wireless communication system 60. In order to minimize the risks of losing a message emitted by a terminal 70, the planning of the access network 80 is often carried out in such a way that a given geographic zone is simultaneously covered by a plurality of base stations 81, in such a way that a message emitted by a terminal 70 can be received by a plurality of base stations 81.

Each base station 81 is adapted to receiving messages from the terminals 70 that are located within range of it. Each message thus received is for example transmitted to the server 82 of the access network 80, optionally accompanied by other information such as an identifier of the base station 81 that received it, a value representative of the quality of the radio signal carrying the message, the central frequency on which the message was received, a date on which the message was received, etc. The server 82 processes for example all of the messages received from the various base stations 81. The server 82 can in particular be used for the implementation of the method 10 for geolocating a terminal 70 of the system 60.

Figure 4:
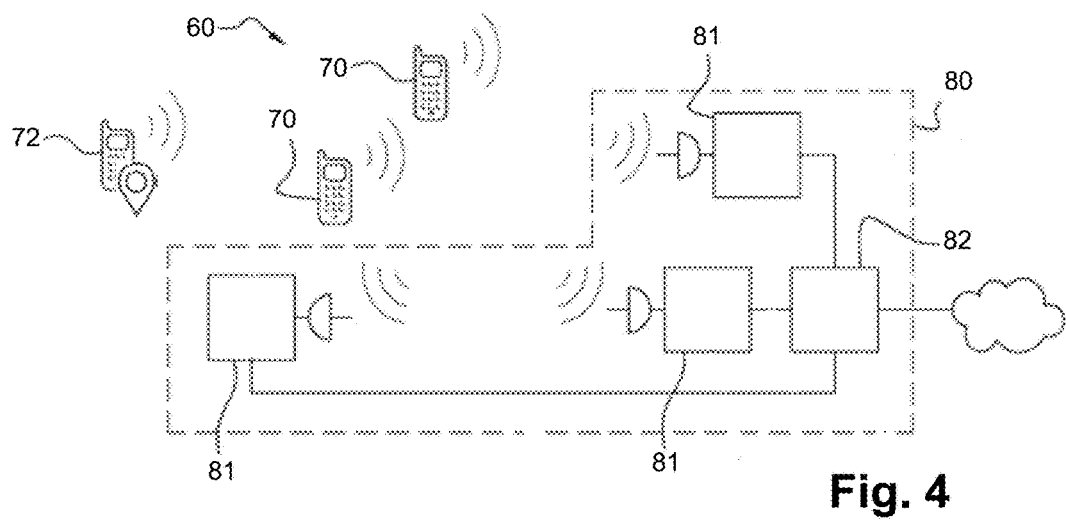
FIG. 4: a diagram of a preferred embodiment in which the calibration device is a terminal equipped with a positioning system.

FIG. 4 schematically shows a preferred embodiment of such a system 60 in which certain terminals 72 of the wireless communication system 60, called "calibration terminals 72", have a positioning system (for example a GPS receiver) that allows to obtain with precision the geographic position of the terminal 72 (for example when the latter is located in a location in which it can receive the signals of the satellites of said positioning system). These calibration terminals 72 act as the calibration devices 71 mentioned above in addition to their routine functions in the wireless communication system 60.

It should be noted that other methods are possible for obtaining the geographic position of a calibration terminal 72. For example, the geographic position of a calibration terminal 72 can be determined on the basis of the MAC address (acronym for "Medium Access Control") of a Wi-Fi access point to which said calibration terminal 72 is connected if the geographic position of said access point is known. The choice of a particular method for determining the geographic position of a calibration terminal 72 is merely an implementation alternative of the invention.

Figure 5:
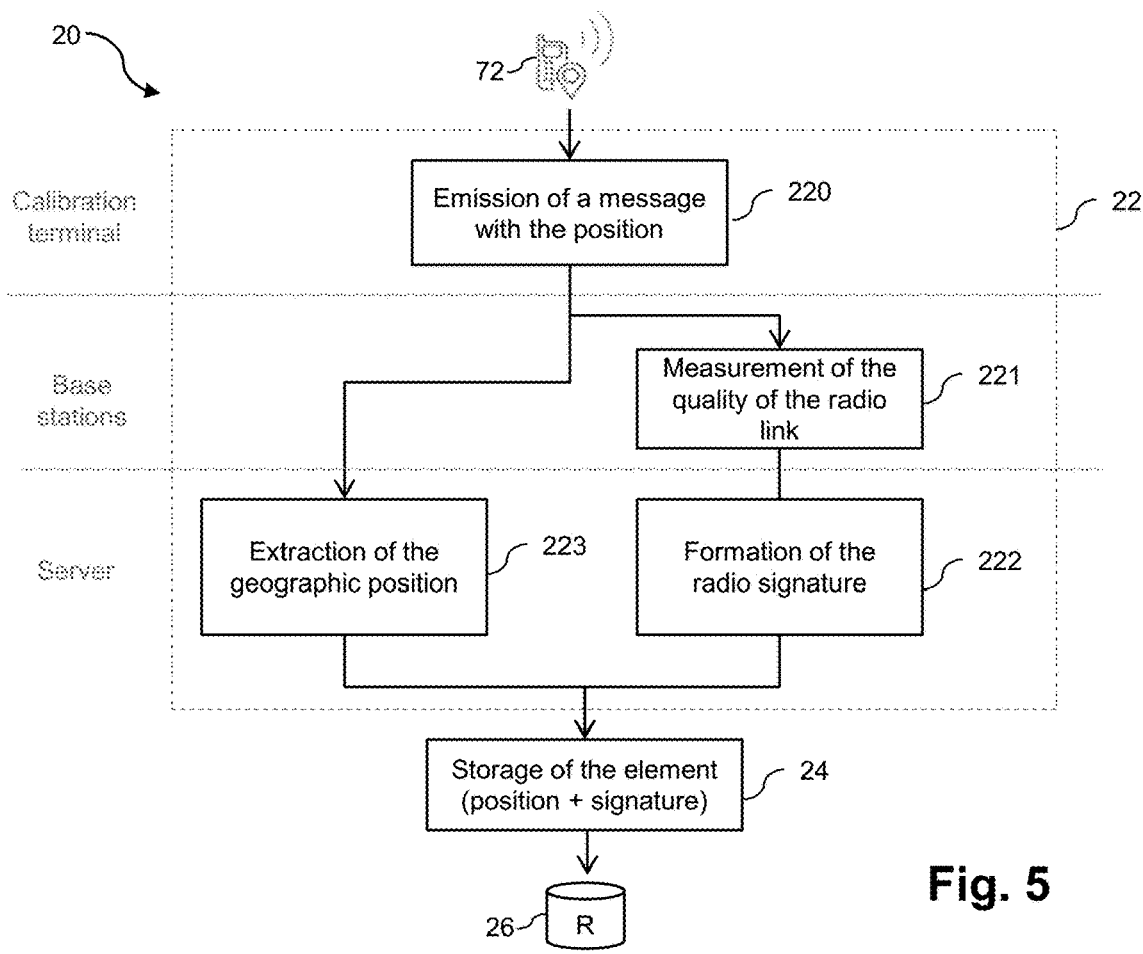
FIG. 5: a diagram illustrating the main steps of a preferred embodiment of the calibration phase of the geolocation method.

FIG. 5 shows the main steps of a preferred embodiment of the calibration phase 20 of the geolocation method 10.

For this calibration phase 20, rather than intentionally traveling across the geographic zone to be covered with a specific apparatus adapted to determining a geographic position and measuring values representative of quality of radio link at this position, it is advantageous to use the possible capacity of certain terminals of the system to carry out this role, this is the case of the calibration terminals 72.

Thus, a first step of the calibration phase 20 involves the emission 220 by a calibration terminal 72 of a message containing the current geographic position to the access network 80 of the wireless communication system 60. It should be noted that this message can be emitted independently of the geolocation method 10. For example, this can be a conventional message for remotely reading information including the current geographic position and not having a main goal of participating in the calibration phase 20 of the geolocation method 10.

The base stations 81 of the access network 80 that received the signal containing said message thus carry out a measurement 221 of the quality of the radio link over which the message was transmitted. In a preferred embodiment, and in the rest of the description as a non-limiting example, the value representative of the quality of the radio link used is the average level of received power (RSSI) received, for example expressed in decibels, by the base station 81 for the signal carrying said message.

It should be noted that other values representative of the quality of the radio link could be used, for example such as the attenuation of the signal, a signal-to-noise ratio of the signal (SNR or "Signal on Noise Ratio" in the Anglo-Saxon literature) or an indicator of quality of the communication channel (CQI or "Channel Quality Indicator" in English).

In a step 222 of forming the radio signature, the server 82 thus collects the RSSI levels measured by the various base stations 81 and includes them in the radio signature thus determined for the calibration terminal 72. For the base stations 81 that did not receive the message, for example because the terminal 72 is too far away and is not located in their radio coverage, a default value of −160 dB is for example used.

It should be noted that a plurality of alternatives are possible for the choice of the base stations to take into account for the formation of a radio signature. According to a first example, conventionally, all the base stations of the wireless communication system 60 are considered. According to another example, it is possible to limit the number of base stations to take into account, for example according to a limited geographic zone of interest.

The server 82 thus carries out the extraction 224 of the information on the geographic position contained in the message emitted by the calibration terminal 72 (as a reminder, this message was previously transmitted to the server 82 by the base stations 81 that received it).

Finally, the pair of pieces of information formed by the geographic position of the calibration terminal 72 and the associated radio signature is added to the set 26 of reference elements acquired during the calibration phase 20. For example, this step involves the storage 24 of the pair of pieces of information formed by the geographic position and the associated radio signature in a database memorized in the server 82.

In specific embodiments, the steps of the calibration phase 20 described above are repeated over a predefined time, for example over several days, or even several weeks or several months, for calibration terminals 72 of the wireless communication system 60, in order to obtain a set 26 of reference elements containing a significant number of pieces of information, that is to say a precise map of the zone to be covered. In one alternative, the steps of the calibration phase 20 are repeated until a predefined number of reference elements in the set 26 is obtained.

In a preferred embodiment, the set 26 of reference elements is continually enriched by new reference elements coming from the calibration terminals 72. Such arrangements allow in particular to discover new points of interest that can appear over time and/or forget points of interest that have become obsolete.

It should be noted that, just like the terminals 70 of interest, the calibration terminals 72 are mobile and they can thus provide reference data corresponding to different geographic positions.

In specific embodiments, the set 26 of reference elements is also continually enriched by elements each corresponding to an estimated geographic position of a terminal 70 of interest, associated with the radio signature of said terminal 70 of interest.

It should also be noted that according to other embodiments, the information on the current geographic position of the calibration terminal 72 could be emitted by a communication system other than that for which the measurements of RSSI allowing to define the radio signature of said calibration terminal 72 are carried out. For example, the current geographic position of the calibration terminal 72 could be emitted to the server 82 via a mobile telephony network of the GSM, UMTS or LTE type, while the message for which the measurements of RSSI are carried out is emitted to an access network 80 of the UNB wireless communication system 60. In order to facilitate, in the server 82, the association of the radio signature determined for the calibration terminal 72 with its current geographic position, it is possible, for example, to timestamp the message carrying the information on the current geographic position and the message emitted to the UNB wireless communication system.

Figure 6:
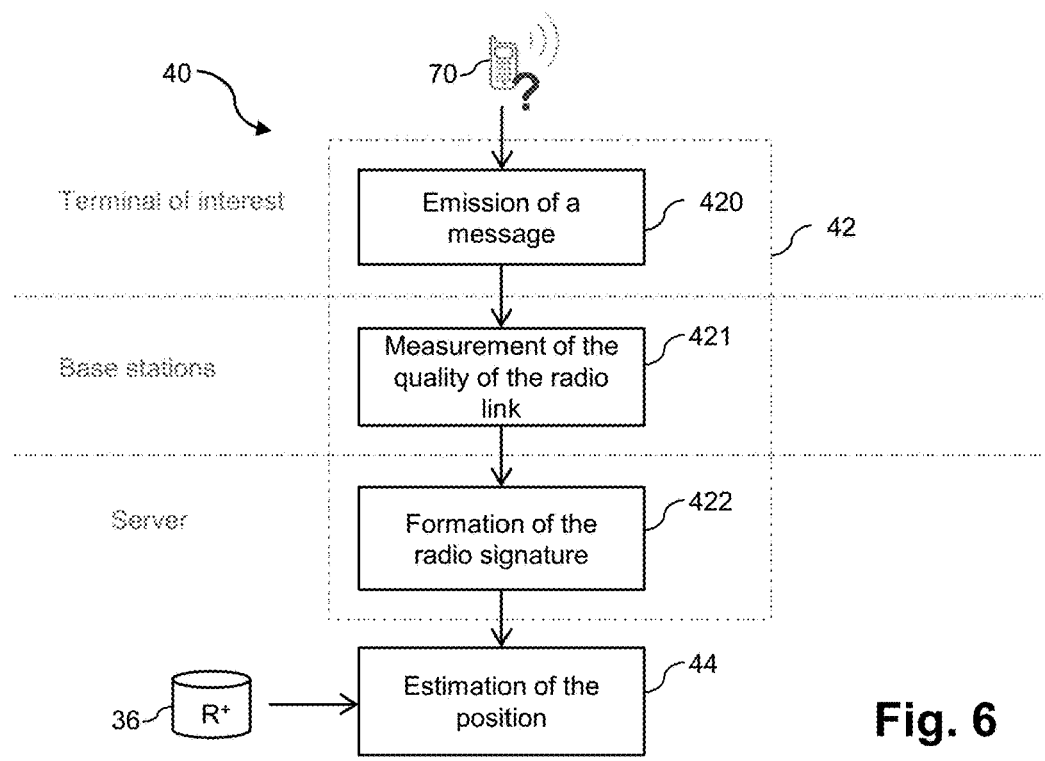
FIG. 6: a diagram illustrating the main steps of a preferred embodiment of the search phase of the geolocation method.

FIG. 6 shows the main steps of a preferred embodiment of the search phase 40 for the geolocation method 10.

This search phase 40 is initiated by the emission 420 of a message by a terminal 70 of interest to the access network 80 of the wireless communication system 60. This message can be any given message emitted independently of the method 10 for geolocating the terminal. For example, this message can be emitted for purposes of remote reading of information that has nothing to do with the geolocation of the terminal 70. Alternatively, this message can be emitted intentionally with the goal of geolocating terminal 70. In all cases, the contents of the message are not necessarily of importance in the search phase 40.

Similarly to that which is carried out for the calibration phase 20, the base stations 81 of the access network 80 that have received said message carry out a measurement 421 of the RSSI level of the signal carrying the message.

In a step 422 of forming the radio signature, the server 82 thus collects the RSSI levels measured by the various base stations 81 and includes them in the radio signature thus determined for the terminal 70 of interest.

The estimation 44 of the geographic position of the terminal 70 of interest having emitted the message is thus carried out on the basis on the one hand of the set 36 of reference elements modified by the refining phase 30, and on the other hand of the radio signature determined for the terminal 70 of interest, the geographic position of which must be estimated.

Figure 7:
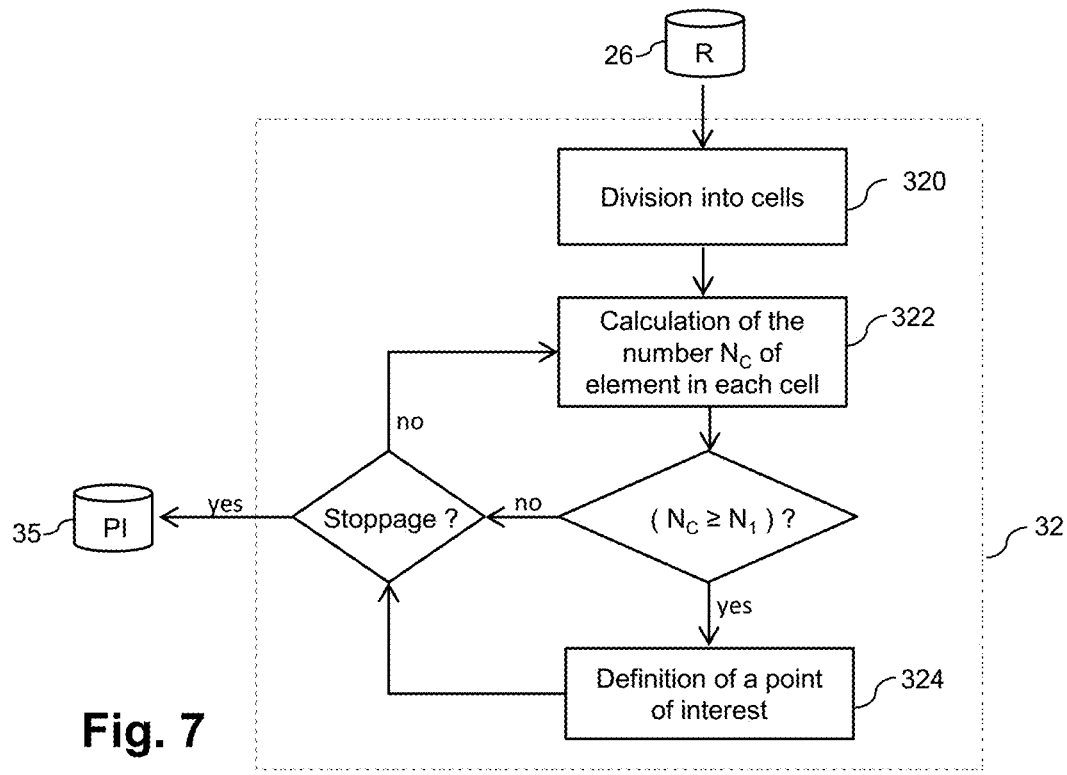
FIG. 7: a diagram illustrating the main steps of a first specific embodiment of a step of identifying points of interest.

FIG. 7 schematically shows the main steps of a first specific embodiment of the step 32 of identifying the points of interest. This step 32 of identifying the points of interest is implemented by the serve 82 during the refining phase 30 on the basis of the set 26 of reference elements acquired during the calibration phase 20.

A first step corresponds to a division 320 of the geographic zone to be covered into a plurality of cells, the dimensions of which are predefined. This division can correspond for example to a division of the geographic zone to be covered into a regular grid, the cells thus corresponding to identical squares. According to another example, the cells can have a circular shape with a predefined fixed diameter and partial overlapping of each cell with at least one other cell in order to cover the totality of the geographic zone. According to yet another example, the cells can have different shapes and/or dimensions defined for example according to certain pieces of information known a priori on the division of the terminals 70 over the geographic zone to be covered.

The server 82 then carries out a step 322, for each cell, of calculating a number $N_C$ of reference elements, the geographic position of which is located inside said cell.

If, for a given cell, the number $N_C$ thus calculated is greater than or equal to a predefined threshold $N_1$, then a point of interest is identified for said cell. The point of interest can for example be defined as being the center of the cell. In one alternative, the point of interest can be defined as an average of the geographic positions of the reference elements located in the cell.

When all the cells have been taken into account, the step 32 of identifying the points of interest ends. A set 35 of the points of interest identified is thus available and memorized in the server 82.

Figure 8:
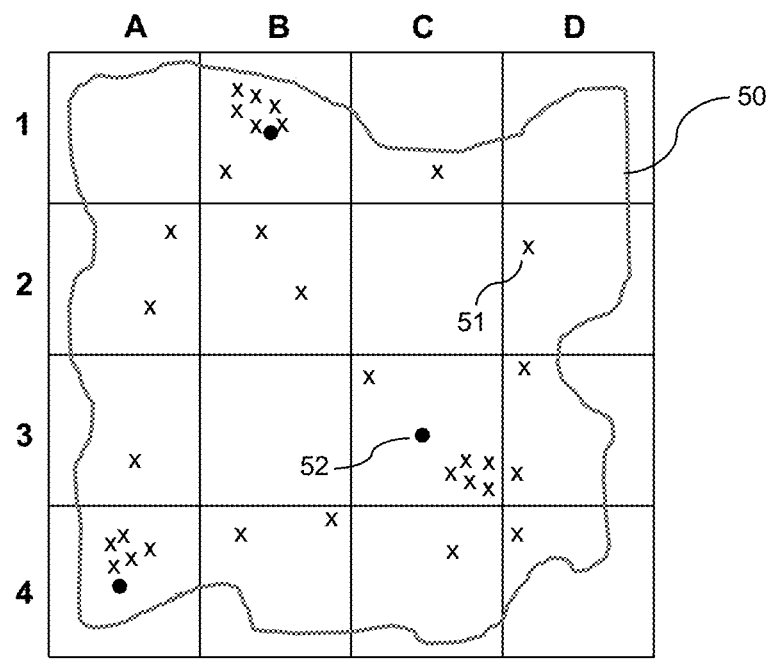
FIG. 8: an illustration of the first specific embodiment of the step of identifying points of interest.

FIG. 8 is an illustration of the first specific embodiment of the step 32 of identifying points of interest described in reference to FIG. 7. A geographic zone 50 is divided into a grid by 16 identical cells in the shape of a square. Each cell is identified by a pair "L-C", L being a letter from A to D, and C being a digit from 1 to 4. Reference elements 51 acquired during the calibration phase 20 are shown in the form of crosses. Each cross represents the geographic position associated with a reference element 51 acquired in the geographic zone 50 considered. In the example considered:

$N_C=0$ for the cells A-1, D-1, C-2 and B-3, $N_C=1$ for the cells C-1, D-2, A-3, C-4 and D-4, $N_C=2$ for the cells A-2, B-2, D-3 and B-4, $N_C=5$ for the cell A-4, $N_C=6$ for the cell C-3, and $N_C=7$ for the cell B-1.

In the example considered, the threshold $N_1$ is set to 5, and a point of interest 52 is defined as being the center of a cell for which $N_C \geq N_1$. Each point of interest 52 thus defined is shown in FIG. 7 by a black dot. In the example in question, three points of interest 52 are identified. They correspond to the center of the cells B-1, C-3 and A-4, respectively.

This first specific embodiment of the step 32 of identifying the points of interest is more or less precise according to the dimensions of the cells. It is clear for example in FIG. 8 that the center of the cell C-3 is relatively far from a more probable position of a point of interest that would be located in the bottom right of the cell, where the majority of the reference elements 51 located in said cell are located.

Figure 9:
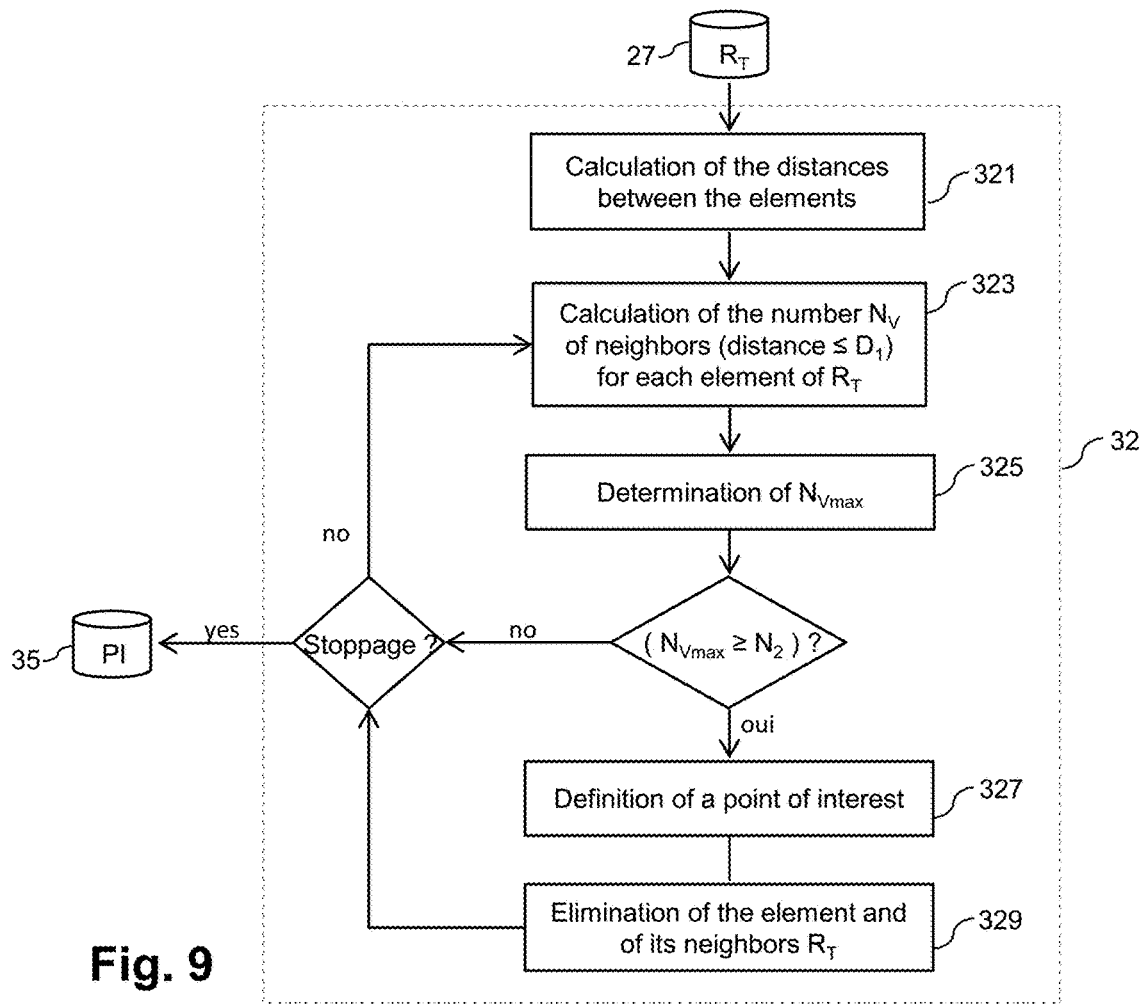
FIG. 9: a diagram illustrating the main steps of a second specific embodiment of the step of identifying points of interest.

FIG. 9 schematically shows the main steps of a second specific embodiment of the step 32 of identifying the points of interest.

For this second specific embodiment of the step 32 of identifying the points of interest, operations are carried out on a temporary set 27 of reference elements that initially corresponds to the set 26 of reference elements acquired during the calibration phase 20. Thus, the set 26 of reference elements acquired during the calibration phase 20 is not modified by this second embodiment of the step 32 of identifying the points of interest.

In a first step, the server 82 carries out a calculation 321 of the distances separating two reference elements of the set 27.

In a second step, for each reference element of the temporary set 27 of reference elements, the server 82 carries out a calculation 323 of the number $N_V$ of reference elements, called "neighboring elements", the distance of which from the reference element considered is less than or equal to a predefined threshold $D_1$.

Then there is a step 325 of determining the number $N_{Vmax}$ corresponding to the greatest value out of the numbers $N_V$ previously calculated.

If $N_{Vmax}$ is greater than or equal to a predefined threshold value $N_2$, the server 82 then carries out a step 327 of defining a point of interest on the basis of the reference element for which the number of neighbors is equal to $N_{Vmax}$, called "element of interest", then a step 329 of eliminating said element of interest and its neighboring elements in the temporary set 27. The point of interest is for example defined as being the average of the geographic positions of the element of interest and of its neighboring elements. According to another example, the point of interest can be defined simply as being the geographic position of the element of interest.

A stoppage condition is then evaluated. As long as said stoppage condition is not reached, there is a reiteration starting from the step 323 of calculating the number of neighbors for the elements remaining in the temporary set 27.

If the number $N_{Vmax}$ calculated in step 325 is less than $N_2$, then the stoppage condition is directly evaluated.

The stoppage condition is for example reached if a predefined number of points of interest have been identified, or if the number $N_{Vmax}$ is less than a predefined threshold, or if there are no more elements in the temporary set 27. When the stoppage condition has been reached, the step 32 of identifying the points of interest ends. A set 35 of the points of interest identified is thus available and memorized in the server 82.

Figure 10:
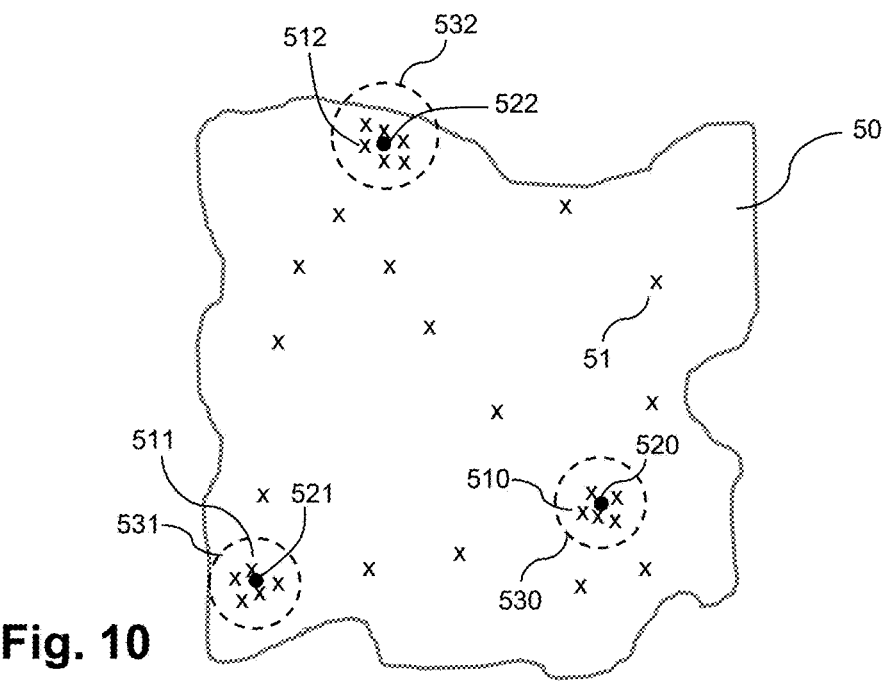
FIG. 10: an illustration of the second specific embodiment of the step of identifying points of interest.

FIG. 10 is an illustration of the second specific embodiment of the step 32 of identifying points of interest described in reference to FIG. 9.

FIG. 10 shows a geographic zone 50 and reference elements 51 identical to those shown in FIG. 8. Circles 530, 531, 532 shown by dotted lines respectively group together an element of interest 510, 511, 512 and its neighboring elements. In the example considered, a first element 512 of interest is determined with 5 neighboring elements. A point of interest 522 is thus defined as being the average of the geographic positions of said element of interest 512 and of its neighboring elements (located in the circle 532). Then, in a second iteration, a second element 511 of interest is determined with 4 neighboring elements. A point of interest 521 is thus defined. Finally, in a third and last iteration, a third point of interest 520 is defined on the basis of an element 510 of interest also having 4 neighboring elements. It should be noted that in the example in question, if a plurality of elements have the same value $N_{Vmax}$ of neighbors, the choice of one or of the other as an element of interest is arbitrary.

In specific embodiments, the step 32 of identifying the points of interest described in reference to FIGS. 7 and 9 can further include a step of clustering and/or of filtering the points of interest identified. For example, if two points of interest are located at a distance smaller than a predefined threshold, then they are clustered into a single point of interest. According to another example, if for a given point of interest, the number of elements of the set 26 of reference elements located at a distance from said point of interest smaller than a predefined distance is less than a predefined threshold, then said point of interest is eliminated.

In specific embodiments, instead of calculating an integer of reference elements (for example in steps 322 and 323), it is possible to use a value representative of a number of reference elements calculated according to a weighting factor assigned to each reference element and representative of a time passed between the moment of use of the radio links (the measured RSSI levels of which are used to define a radio signature) and the moment at which the points of interest are identified. Such arrangements allow in particular to favor recent points of interest by giving more importance (that is to say by assigning a greater weighting) to the recent reference elements, that is to say to the reference elements corresponding to messages emitted recently by calibration terminals 72. For example, a weighting factor can be defined for a reference element according to time by:

$$w(t) = A \cdot \exp\left(-\frac{t}{2 \cdot \sigma^2}\right)$$

in which function:
A and $\sigma$ are constant parameters,
t is the time passed since the moment at which the message emitted by a calibration terminal 72 and used to define the reference element was received,
exp( ) is the exponential mathematical function.

With such a definition of the weighting factor, the more time that has passed since the reception of the message that was used to define the reference element, the smaller the value of the associated weighting factor and thus the lesser the importance given to the reference element in comparison to other reference elements for which the associated message was received more recently. It is thus possible to accelerate the discovery of new points of interest and ignore obsolete points of interest.

Figure 11:
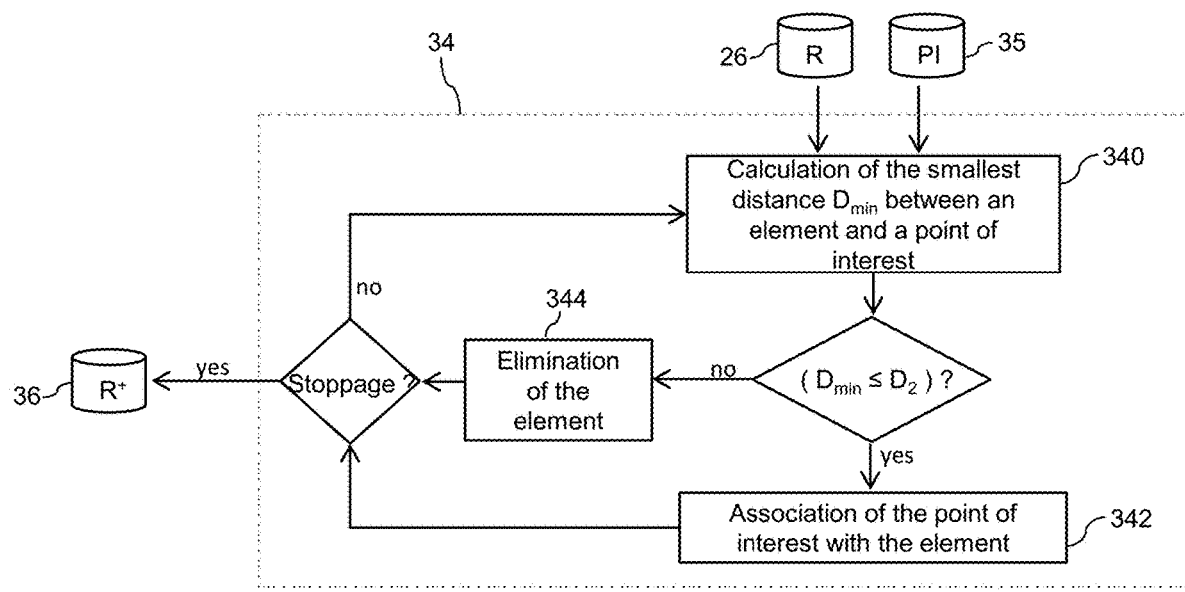
FIG. 11: a diagram illustrating the main steps of a first specific embodiment of a step of modifying a reference set.

FIG. 11 schematically shows the main steps of a first specific embodiment of the step 34 of modifying the set 26 of reference elements on the basis of the set 35 of the points of interest identified.

In a first step, the server 82 carries out, for each element of the set 26 of reference elements, a calculation 340 of the smallest distance $D_{min}$ between said reference element and a point of interest of the set 35 of the points of interest identified.

If this distance $D_{min}$ is less than or equal to a predefined threshold $D_2$, then the server 82 carries out an association 342 between the point of interest corresponding to the distance $D_{min}$ and the reference element. In other words, the reference element is enriched with a unique identifier or label of the point of interest. The reference element thus enriched thus includes a radio signature, a geographic position, and a label corresponding to the point of interest with which it is associated.

If, however, $D_{min} > D_2$, then the server 82 carries out the elimination 344 of the reference element.

When all the reference elements have been taken into account, the modification step 34 ends and a modified set 36 of reference elements is thus available. This set 36 includes only the reference elements that were able to be associated with a point of interest, that is to say the reference elements sufficiently close to a point of interest. The set 36 contains for each point of interest a certain number of associated radio signatures.

Figure 12:
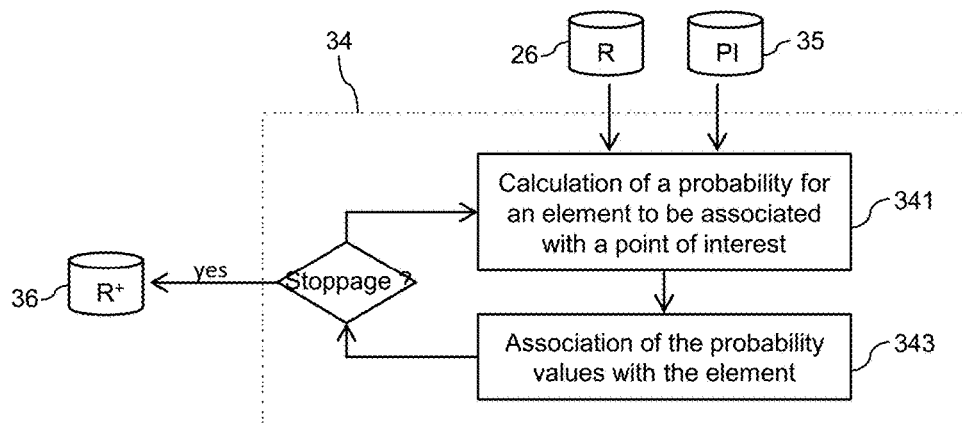
FIG. 12: a diagram illustrating the main steps of a second specific embodiment of the step of modifying the reference set.

FIG. 12 schematically shows the main steps of a second specific embodiment of the step 34 of modifying the set 26 of reference elements on the basis of the set 35 of the points of interest identified.

In a first step, the server 82 carries out, for each reference element of the set 26 of reference elements, a calculation 341, for each point of interest identified, of a value representative of the distance that separates the geographic position of the reference element from that of the point of interest. For a given reference element, it is possible to define, for example according to a Laplace distribution, a "probability" function associating a value between 0 and 1 with each point of interest according to the distance separating the point of interest and the reference element, so that the closer the reference element to a point of interest and the greater the probability value, and so that the sum of the probability values is equal to 1.

The server 82 thus carries out an association 343 of the probability values thus calculated with the reference element. In other words, the reference element is enriched with a set of values, each value representing a probability of being associated with a point of interest. The reference element thus enriched thus includes a radio signature, a geographic position, and a probability value for each point of interest identified.

When all the reference elements have been taken into account, the modification step 34 ends and a modified set 36 of reference elements is thus available. The set 36 thus includes for each radio signature of a reference element a probability of being associated with a point of interest identified.

During the search phase 40, the estimation 44 of the geographic position of a terminal 70 of interest is for example carried out using a conventional classification machine learning algorithm of the "decision tree" type. The fact that the reference elements present in the set 36 have been enriched indeed allows to transform a problem generally approached in the form of a regression into a problem of classification. Indeed, during the refining phase 30, a label is assigned to each point of interest, and the radio signature associated with each reference element is "classified" according to the probability of belonging to a certain label. During the search phase 40, on the basis of the radio signature of a terminal 70 of interest, and using the reference elements present in the modified set 36, the classification algorithm is thus capable of providing a probability for said radio signature of belonging to a certain label. The geographic position of the terminal 70 of interest is thus generally estimated as being the geographic position of the point of interest corresponding to the label having the greatest probability value. If the greatest probability value is less than a predefined threshold, it is also possible to conclude that the terminal 70 of interest is not located at one of the points of interest identified (in which case the terminal 70 of interest is probably in transit between two points of interest).

A plurality of simulations show that the fact that the set 26 of the reference elements has been enriched and/or cleaned up in the refining phase 30 provides the classification algorithm with a meaningful gain in precision. The results of these simulations are illustrated in FIGS. 13 and 14.

To carry out these simulations, a set 26 of reference element is acquired during a calibration phase 20, and it is used for each of the simulations. Moreover, elements, called "test elements", different from the reference elements, are available. Each test element includes a radio signature and a known geographic position. For each test element, a geographic position is estimated and an error distance corresponding to the distance between the estimated geographic position and the known geographic position is calculated. A curve 90 to 96 representing a distribution of the error distance among all the test elements, or among only a sample of the test elements, is thus plotted.

In these simulations, 200,000 reference elements and 200,000 test elements are used. The size of the geographic zone considered corresponds approximately to that of a country as big as France.

Figure 13:
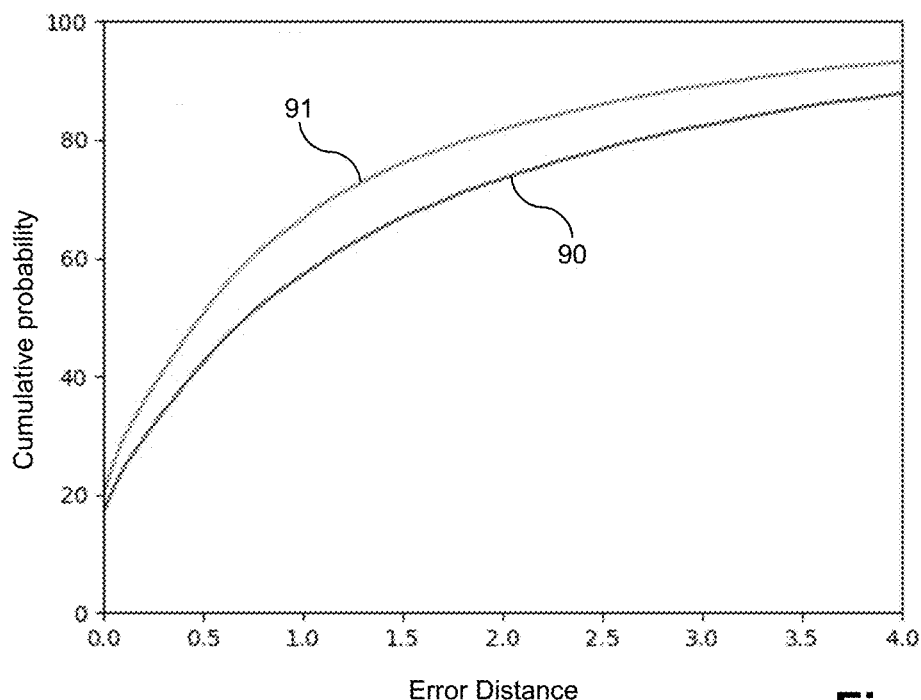
FIG. 13: curves of distribution of an error distance for a conventional geolocation method.
Figure 14:
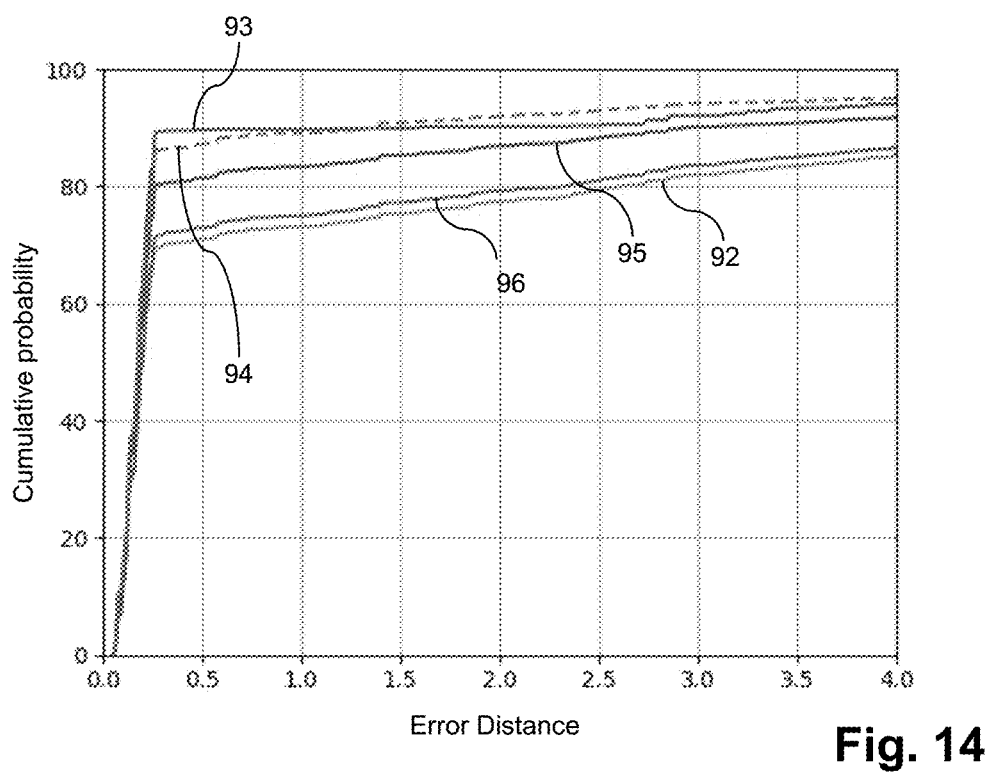
FIG. 14: curves of distribution of an error distance for the geolocation method according to the invention.

For the simulations, the results of which are illustrated in FIG. 13, a conventional geolocation method based on a regression machine learning algorithm is used. A geographic position is estimated by the algorithm for each test element on the basis of the radio signature of said test element and the set 26 of reference elements acquired during the calibration phase 20.

The curve 90 shows the distribution of the error distance for all the test elements available.

As for the curve 91, it shows the distribution of the error distance for a sample corresponding to test elements sufficiently close to points of interest identified. In the example considered, points of interest are identified on the basis of the set 26 of reference elements using the second specific embodiment of the step 32 of identifying the points of interest, as described in reference to FIG. 9, and a test element is considered sufficiently close to a point of interest if the smallest distance ($D_{min}$) between the known geographic position of said test element and an identified point of interest is less than or equal to a threshold ($D_2$). For these simulations, the value of $D_2$ is set to 250 meters.

It is thus clear in FIG. 13 that the regression algorithm is more precise when it estimates the geographic position of a terminal 70 of interest located near one of the points of interest identified. This is explained intuitively by the fact that the learning algorithm has better knowledge of the relationship existing between a radio signature and a geographic position for elements close to a point of interest since in the set 26 the geographic density of reference elements is greater close to the points of interest. The precision of the regression algorithm is, however, dissatisfactory, for example the error distance is less than 0.5 km only in approximately 50% of the cases.

FIG. 14 illustrates the results obtained with a geolocation method 10 according to the invention. A classification machine learning algorithm is used for the search phase 40, and it uses a set 36 of reference elements modified by a refining phase 30. In the example considered, the refining phase 30 includes a step 32 of identifying the points of interest according to the specific embodiment described in reference to FIG. 9 and a step 34 of modifying the set 26 of reference elements according to the specific embodiment described in reference to FIG. 11. The classification algorithm thus provides, for a test element considered, a value of probability for said test element of being associated with an identified point of interest. The estimated geographic position of the test element is thus defined as being the geographic position of the point of interest for which said probability value is the greatest. For these simulations, the value of $D_1$ is also set to 250 meters, and the threshold value $N_2$ is set to 300.

The curve 92 shows the distribution of the error distance for all the test elements available. In this case, the error distance is less than 0.5 km in approximately 70% of the cases.

The curve 93 shows the distribution of the error distance for the sample of test elements used for the curve 91 corresponding to test elements considered to be sufficiently close to identified points of interest (distance to a point of interest less than or equal to the threshold $D_2$). For this sample, the error distance is less than 0.5 km in approximately 90% of the cases.

The curve 94 shows the distribution of the error distance for a sample of test elements for which the greatest probability value associated with a point of interest is greater than or equal to 0.9. For this sample, the error distance is less than 0.5 km in approximately 87% of the cases. This sample groups together 56% of the test elements. In this case, 32% of the test elements considered to be close to a point of interest (distance less than or equal to the threshold $D_2$) were "falsely" removed from the sample.

The curve 95 shows the distribution of the error distance for a sample of test elements for which the greatest probability value associated with a point of interest is greater than or equal to 0.7. For this sample, the error distance is less than 0.5 km in approximately 82% of the cases. This sample groups together 76% of the test elements. In this case, 15% of the test elements considered to be close to a point of interest (distance to a point of interest less than or equal to the threshold $D_2$) were "falsely" removed from the sample.

The curve 96 shows the distribution of the error distance for a sample of test elements for which the greatest probability value associated with a point of interest is greater than or equal to 0.4. For this sample, the error distance is less than 0.5 km in approximately 73% of the cases. This sample groups together 96% of the test elements. In this case, 1.5% of the test elements considered to be close to a point of interest (distance to a point of interest less than or equal to the threshold $D_2$) were "falsely" removed from the sample.

In the various cases represented by the curves 92 to 96, the error distance is less than 0.2 km in approximately 50% of the cases.

It is thus clear that the geolocation method 10 according to the invention, the results of which are illustrated by the curves 92 to 96 of FIG. 14, is clearly more precise than a conventional geolocation method 10, the results of which are illustrated by the curves 90 and 91 of FIG. 13.

The results illustrated in FIG. 14 show that with the geolocation method 10 according to the invention, it is possible to estimate with good precision the geographic position of a terminal 70 of interest located near a point of interest. It is also possible to determine whether the terminal 70 of interest has a strong probability of being in transit between two points of interest (for example if the greatest probability value returned is less than a predefined threshold).

The probability threshold value allows to determine whether the position of a terminal 70 of interest can be associated with the position of a point of interest, or if on the contrary it must be considered that said terminal 70 of interest is in transit between points of interest. This probability threshold value can for example be determined according to a curve connecting the quality of the prediction and the confidence probability of this prediction (for example on the basis of the point of inflection or Youden's index of an ROC (acronym for "Receiver Operating Characteristic") curve. According to another example, it can be chosen in an arbitrary manner according to constraints related to the field of use. For example if having a very high precision of geolocation of a terminal 70 of interest is needed, at the risk of not being able to estimate the position of a significant number of terminals 70 of interest, a high probability threshold value must be taken, for example the value 0.9 like for the example illustrated with the curve 94. If on the contrary it is necessary to be able to geolocate a large proportion of terminals 70 of interest, at the risk of reducing the precision of geolocation, then a lower probability threshold value must be taken, for example the value 0.4 like for the example illustrated with the curve 95. For the example considered, namely a method for geolocating pallettes of merchandise over a significant geographic surface area corresponding for example to a country or a continent, a probability threshold value of approximately 0.7 appears to be a good compromise.

The above description clearly illustrates that, by its various features and advantages, the present invention achieves the goals set and further provides additional advantages.

In particular, the geolocation method 10 according to the invention considerably improves the performance in terms of precision with respect to conventional geolocation methods based on learning methods. This gain in precision is in particular due to the refining phase 30 which allows to reinforce a relationship between a radio signature and a geographic position by taking advantage of the existence of points of interest at which the probability of the presence of a terminal 70, 72 is greater than elsewhere. The refining phase 30 also allows to eliminate disparate elements that do not correspond to a point of interest and that contribute to generating a "noise" that limits the performance of the learning algorithm.

Moreover, the elimination of disparate elements contributes to reducing the number of reference elements used by the learning algorithm, and thus to reducing the complexity thereof, which translates into a gain in terms of capacity and calculation time.

Moreover, the elimination of disparate elements can contribute to reducing the size of the radio signature (that is to say the number of RSSI measurements of a radio signature) by only considering the base stations that are located near the points of interest, which contributes even more to reducing the complexity of the learning algorithm.

The fact that the list of the points of interest for the terminals 70, 72 of the system 60 is known can also be of interest per se, for example to know the list of the warehouses used in the transport of merchandise. Another advantage is based on the possibility of assigning a weighting factor to each reference element according to the time that has passed since the moment at which a message was emitted by a calibration terminal 72 to enrich the set 26 of reference elements. Indeed, this allows to accelerate the discovery of new points of interest and favor the forgetting of obsolete points of interest.

Thus, the setting up of such a geolocation method 10 in a wireless communication system 60 like that which has been described as an example is particularly not costly. Indeed, it does not require additional specific hardware at the majority of the terminals 70 or of the base stations 81, and via the existence of certain special terminals 72 equipped with a positioning system in the system 60 it allows to entirely automate the calibration phase 20.

In general, it should be noted that the embodiments considered above have been described as non-limiting examples, and that other alternatives are consequently possible.

In particular, the embodiments of the step 32 of identifying the points of interest and 34 of modifying the set 26 of reference elements have been given as an example, and other methods are possible as alternatives of the invention.

The invention has been described for an ultra-narrowband wireless communication system 60 adapted to uses of the IoT type, but nothing prevents implementing a geolocation method 10 according to the invention for other types of communication system for example such as GSM, UMTS, LTE, Wi-Fi, etc. cellular networks.

The measurements representative of the radio-link quality level used to form a radio signature can be carried out by base stations, on an upstream radio link, but also by terminals, on a downstream radio link. The measurements are for example transmitted to a server which then carries out the other steps of the geolocation method. According to other examples, the measurements representative of the radio-link quality level could be carried out by the server itself, on the basis of information received from the terminals and/or from the base stations.

As indicated above, the value representative of the radio-link quality can be different from the RSSI level. This can be for example a level of attenuation of the signal, a signal-to-noise ratio, or another indicator of radio-channel quality.

In the example considered, a reference element corresponds to the geographic position obtained by the GPS receiver of a calibration terminal 72 associated with the radio signature of said calibration terminal 72 at said geographic position. In specific embodiments, the set 26 of reference elements can further be continually enriched with reference elements each corresponding to a geographic position of a terminal 70 of interest estimated during the search phase and associated with the radio signature of said terminal 70 of interest located at this position.

Other methods are nevertheless possible for defining the set 26 of reference elements. For example, the geographic position of a calibration terminal 72 can be estimated during the calibration phase by a conventional geolocation method based on a regression machine learning algorithm. According to yet another example, the geographic position of a calibration terminal 72 can be estimated during the calibration phase using another geolocation method, for example a method of the TDOA (acronym for "Time Difference Of Arrival") type based on measurements of propagation time of a signal exchanged between a terminal and various base stations.

For the search phase, various classification machine learning algorithms can be used to estimate the geographic position of a terminal 70 of interest on the basis of its radio signature and the modified set 36 of reference elements. The fact that one or the other of these algorithms is used merely constitutes an alternative embodiment of the invention.

The invention has been described while considering the field of transport of merchandise. Nothing, however, excludes considering other fields of use for the geolocation method 10 according to the invention, in particular fields for which the terminals to be geolocated are capable of preferably occupying specific geographic positions or passing through specific geographic positions through which a large number of terminals 70 of the system 60 tend to pass (geolocation of luggage in airports, geolocation of parcels, etc.).

In the example described, the points of interest are identified dynamically on the basis of the reference elements provided by calibration terminal 72. Nothing, however, prevents, in specific embodiments, all or a part of the points of interest from being known a priori and radio signatures associated with these points of interest from being determined using calibration devices 71 that can be moved intentionally to said points of interest known a priori.

The invention claimed is:

1. A geolocation method for geolocating a terminal of interest of a wireless communication system, comprising:
   determination, according to messages transmitted by calibration terminals and received by a plurality of base stations of the wireless communication system, of a set of reference elements, each reference element comprising a radio signature associated with a geographic position of a calibration terminal when a message is transmitted, the radio signature corresponding to a set of values representative of quality of radio links existing between said calibration terminal and said plurality of base stations;

identification of points of interest in accordance with the geographic positions of the reference elements of the set of reference elements;

modification of the set of reference elements in accordance with the points of interest identified;

determination, according to a message transmitted by the terminal of interest located at a geographic position to be estimated, of a radio signature of the terminal of interest, wherein the message transmitted by the terminal of interest is received by a subset of said plurality of base stations;

estimation of a geographic position of the terminal of interest in accordance with the radio signature of the terminal of interest and the set of reference elements modified; and wherein the points of interest are identified independently from the radio signature of the terminal of interest at the geographic position to be estimated.

2. The geolocation method according to claim 1, wherein the geographic position of the terminal of interest is estimated as a value representative of a probability of the terminal of interest of being located at an identified point of interest.

3. The geolocation method according to claim 1, wherein the identification of the points of interest comprises:

dividing a geographic zone to be covered into a plurality of cells having a predefined size;

calculating, for each cell, a value representative of a number of reference elements located in said each cell; and defining a point of interest according to at least one of said each cell and the geographic positions of the reference elements located in said each cell in response to a determination the value calculated satisfies a predefined criterion.

4. The geolocation method according to claim 3, wherein the value representative of the number of reference elements is calculated according to a weighting factor assigned to each reference element and representative of an elapsed time between a transmission of the message by the calibration terminal and the identification of the points of interest.

5. The geolocation method according to claim 1, wherein the identification of the points of interest comprises:

calculating, for each reference element, distances separating said each reference element and each other reference element; and performing iteratively on a temporary set of reference elements initially corresponding to the set of reference elements until a stoppage condition is reached:

calculating, for each reference element of the temporary set of reference elements, a value representative of a number of neighboring elements, the neighboring reference elements being reference elements located at a distance lower than a first predefined threshold;

determining a maximum calculated value and designating a reference element of the temporary set of reference elements associated with the maximum calculated value as an element of interest; and in response to a determination that the maximum calculated value is greater than a second predefined threshold:

defining a point of interest according to geographic positions of at least one of the element of interest and the neighboring elements of the element of interest; and eliminating the element of interest and the neighboring elements of the element of interest from the temporary set of reference elements.

6. The geolocation method according to claim 5, wherein the value representative of the number of reference elements is calculated according to a weighting factor assigned to said each reference element and representative of an elapsed time between a transmission of the message by the calibration terminal and the identification of the points of interest.

7. The geolocation method according to claim 1, further comprising filtering the points of interest identified according to at least one of geographic positions of the points of interest identified and a value representative of a number of reference elements of the set of reference elements located at a distance lower than a predefined threshold.

8. The geolocation method according to claim 1, wherein the modification of the set of reference elements comprises for each reference element of the set of reference elements:

calculating a minimum distance separating said each reference element and one of the points of interest identified; and associating a point of interest associated with the minimum distance with said each reference point if the minimum distance is less than a predefined threshold, otherwise eliminating said reference element from the set of reference elements.

9. The geolocation method according to claim 1, wherein the modification of the set of reference elements comprises, for each reference element of the set of reference elements:

calculating, for each point of interest identified, a value representative of a distance separating said each reference element from said each point of interest; and associating the values calculated with said each reference element.

10. The geolocation method according to claim 1, wherein a radio link is an upstream link to a base station of the wireless communication system.

11. The geolocation method according to claim 10, wherein the determination of the radio signature of a terminal comprises:

transmitting by said terminal of a message to said plurality of base stations;

measuring, for each base station, a value representative of a quality of the radio link existing between said terminal and said each base station in accordance with the message received from said terminal; and forming, by a server connected to said plurality of base stations, the radio signature of the terminal in accordance with the values measured.

12. The geolocation method according to claim 11, wherein the terminal is a calibration terminal equipped with a positioning system and the determination of the radio signature of said calibration terminal further comprises:

including a current geographic position of said calibration terminal measured by the positioning system in a message transmitted by said calibration terminal; and extracting the current geographic position contained in said message by the server.

13. The geolocation method according to claim 1, wherein a value representative of the quality of a radio link existing between a terminal and a base station is a level of received power of a radio signal exchanged between said base station and said terminal.

14. The geolocation method according to claim 1, wherein a radio link is an ultra-narrowband communication channel.

15. The geolocation method according to claim 1, wherein the estimation of the geographic position of the terminal of interest is performed using a machine learning decision tree classification algorithm.

16. A wireless communication system comprising terminals, an access network comprising a plurality of base stations and a server connected to said plurality of base stations, and a database configured to memorize a set of reference elements formed in accordance with messages transmitted by calibration terminals and received by a subset of said plurality of base stations, each reference element comprising a radio signature associated with a geographic position of a calibration terminal when a message is transmitted, the radio signature comprising values representative of quality of radio links existing between said calibration terminal and said plurality of base stations; and wherein thee access network is configured to:

identify points of interest in accordance with the geographic positions of the reference elements of the set of reference elements;

modify the set of reference elements in accordance with the points of interest identified;

measure values representative of the quality of radio links existing between a terminal of interest and said plurality of base stations;

form a radio signature corresponding to the values measured for the terminal of interest;

estimate a geographic position of the terminal of interest in accordance with the radio signature of the terminal of interest and the set of reference elements modified; and wherein the points of interest are identified independently from the radio signature of the terminal of interest at the geographic position to be estimated.

* * * * *